Dec. 29, 1925.　　　　　　　　　　　　　　1,567,761

J. SLEPIAN

RECTIFYING SYSTEM

Filed May 23, 1919

WITNESSES:
H. J. Shelhamer
D. C. Davis

INVENTOR
Joseph Slepian
BY
Wesley G. Carr
ATTORNEY

Patented Dec. 29, 1925.

1,567,761

UNITED STATES PATENT OFFICE.

JOSEPH SLEPIAN, OF WILKINSBURG, PENNSYLVANIA, ASSIGNOR TO WESTINGHOUSE ELECTRIC & MANUFACTURING COMPANY, A CORPORATION OF PENNSYLVANIA.

RECTIFYING SYSTEM.

Application filed May 23, 1919. Serial No. 299,243.

*To all whom it may concern:*

Be it known that I, JOSEPH SLEPIAN, a citizen of the United States, and a resident of Wilkinsburg, in the county of Allegheny and State of Pennsylvania, have invented a new and useful Improvement in Rectifying Systems, of which the following is a specification.

My invention relates to rectifying systems, and it has for its object to provide systems of the character designated that shall permit the rectification of each voltage and current wave at its zero value, whereby the rectification of extremely high voltages may be attained with little or no difficulty from sparking and allied commutating phenomena.

Figure 1:
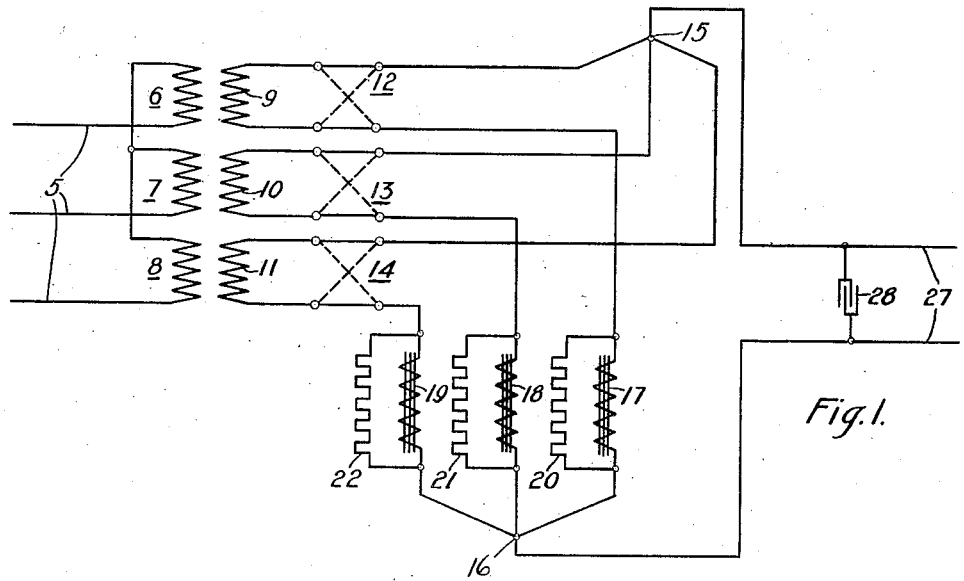
Figure 2:
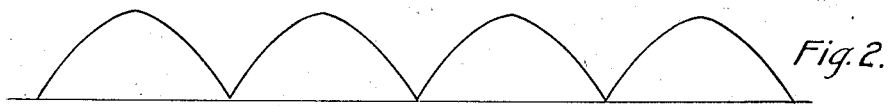
Figure 3:
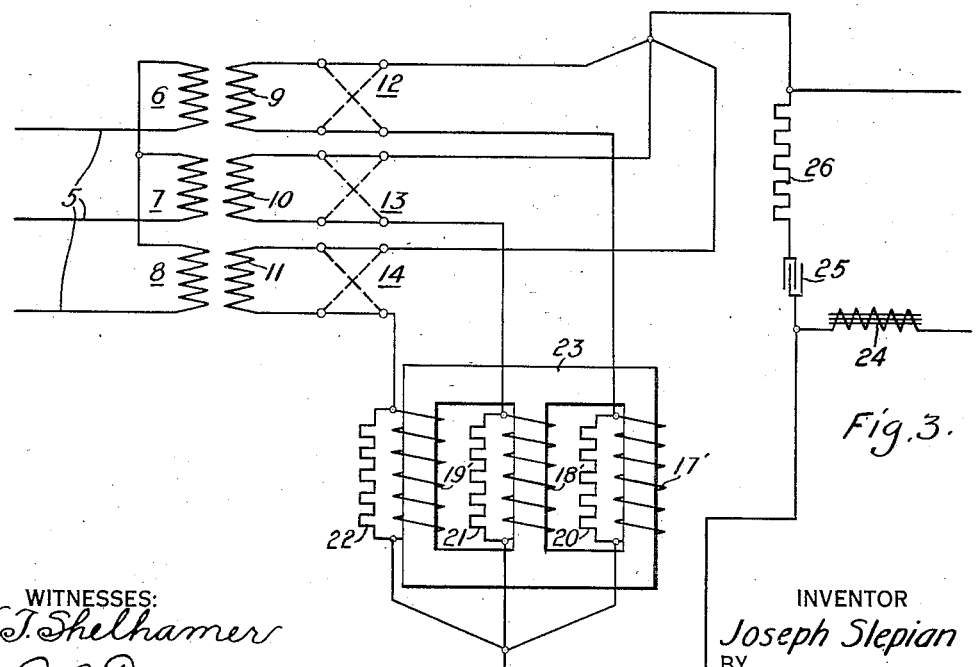

In the accompanying drawing, Fig. 1 is a diagrammatic view of a rectifying system embodying one form of my invention; Fig. 2 is a diagram of the current impulses as produced in the system of Fig. 1, and Fig. 3 is a view similar to Fig. 1 and illustrative of a modification thereof.

If an alternating current be rectified into a series of unidirectional current impulses, these impulses may be considered as the sum to infinity of a current wave of zero frequency, that is to say, a direct-current, combined with the upper even harmonics, in exactly the same way as any symmetrical alternating function may be considered as resolved in a fundamental and upper odd harmonics, all in accordance with the principles of Fourier's series. Thus, if a single-phase alternating current is rectified and means are provided for the elimination of the even harmonics from the resultant flow of unidirectional impulses, there will remain but the residual direct-current flow and, if polyphase electromotive forces are rectified and the resultant unidirectional components are combined in a common circuit, an extremely uniform load current may be derived therefrom, only a minor flow of the upper even harmonics being permitted for commutation, as will hereinafter more fully appear.

For desirable rectification, the total impedance of the circuit should be the same for all the harmonics that it is for the fundamental. The impedance offered to the fundamental is that of the load circuit and thus the impedance offered to each of the upper harmonics should be that of the load circuit.

In accordance with the present invention, I provide means whereby the fundamental or direct current flows directly to the load circuit with substantially no impedance, other than that of the load circuit, and I further provide means whereby each of the upper harmonics is caused to traverse a path having a resistance that is substantially equivalent to that of the load circuit, whereby distortion is prevented and the voltage and current waves are caused to pass through zero simultaneously.

Referring to Fig. 1 of the accompanying drawing for a more detailed understanding of my invention, three-phase alternating-current supply conductors are shown at 5 in Fig. 1, the energy therefrom being supplied to three, single-phase transformers 6, 7 and 8 having secondary windings 9, 10 and 11, respectively. Rectifying devices 12, 13 and 14, of any desired character, are associated, respectively, with the secondary windings 9, 10 and 11 for the rectification of the electromotive forces thereof. The particular nature of the rectifying devices constitutes no part of the present invention, as they may be of the mechanical, electrolytic or electron-tube type, with appropriate circuit modifications in each case, as will be apparent to those skilled in the art, and I have, accordingly, represented the rectifying devices diagrammatically, as by circuit-reversing means.

One pole of each rectifying device is connected to a neutral point, as at 15, and the remaining poles are connected to a corresponding neutral point 16, through inductive devices 17, 18 and 19, respectively, these inductive devices being shunted by resistors 20, 21 and 22. The load circuit is shown at 27 and is connected between the neutral points 15 and 16, a condenser 28 being connected in shunt thereto for a purpose to hereinafter more fully appear.

Having thus described the arrangement of a system embodying my invention, the operation thereof is as follows. Considering first of all but a single phase, it is apparent that a series of unidirectional current impulses is produced, for example, at the ter- minals of the rectifying device 12, as indicated in Fig. 2. This series of impulses, being a purely unidirectional pulsating function, may be resolved into the sum to infinity of a current wave of zero frequency, that is, direct current, and of the upper even harmonics. The insertion of the inductive device 17 in the circuit between the rectifying device 12 and the load circuit 27 largely stops these upper harmonics while producing substantially no effect upon the fundamental of zero frequency. Particular attention is directed to the fact that the inductive reactor 17 presents substantially no ohmic resistance to the passage of the direct current, the latter flowing to the load circuit 27 and encountering only the resistance thereof. All upper harmonics are forced to traverse the resistor 20.

Similarly, the unidirectional-current flow from the transformers 10 and 11 traverses the inductive reactors 18 and 19, respectively, and the upper harmonics thereof are forced to traverse the resistors 21 and 22, respectively.

The upper harmonics, other than the even multiples of 3, such as the 6th, 12th, etc., form perfect three-phase systems and, therefore, add to zero at the neutral points 15 and 16. If each of the resistors 20, 21 and 22 has substantially three times the resistance of the load circuit, as above specified, their resistance is equivalent to that of the load circuit and thus they offer the same impedance to the harmonics as is offered to the fundamental by the load circuit itself.

The calculation of the proper value of the resistances 20, 21 and 22 may be made as follows:

It is desired that the fundamental direct-current component, and all of the alternating-current components, shall encounter the same voltage drop per ampere of current. The fundamental components in the three branches combine in the direct-current load circuit, so that the voltage drop in said load circuit for each ampere of current in any branch corresponds to three times the resistance thereof, assuming a unit direct-current component in each of the phases.

The circuit may be traced in any phase, starting, for example, with coil 11, thence through the rectifying device 14, the neutral point 15, the load 27, the neutral point 16, the resistance element 22, and the rectifying device 14, back to said coil 11. Considering the harmonics other than the 6th, 12th, etc., it will be evident that there will be no current flow of said harmonics through the load circuit 27, since the currents in the three phases add to zero at the neutral points 15 and 16, as above pointed out. Hence, the only voltage drop, encountered by said harmonics in the circuit just traced, occurs in the resistance 22, which must, therefore, have a value equal to three times the resistance of the load 27. It is understood, of course, that in speaking of the resistance of the load circuit 27, a back electromotive force in said load circuit must be reduced to terms of a resistance which would cause an equal potential drop.

The 6th, 12th, etc., harmonics in the respective phases are in phase with each other, and hence would be supplied directly to the load circuit except for the bypass through the condenser 28. These harmonic currents also traverse the resistors 20, 21, 22 and, therefore, are forced to traverse an impedance equivalent to that of the load circuit, the reactance of the condenser 28 being negligible to these relatively high-frequency currents.

Thus, it will be noted that all the upper harmonics, which aid materially in the provision of satisfactory commutating conditions at the rectifying device, traverse the rectifying device, whereas all of these harmonics are filtered from the load circuit. At the same time, the rectified wave is in no way distorted, as it would be were different impedance offered to different components thereof and thus, simultaneous rectification of the voltage and of the current waves is rendered possible.

The only current supplied to the load circuit is the arithmetical sum of the fundamentals of zero frequency in each branch of the system and, consequently, an extremely uniform resultant load-current flow is produced.

The only currents tending to interfere with commutation in the system of Fig. 1 are the magnetizing currents of the reactors 17, 18 and 19. I may, accordingly, mount the reactors on a common three-phase core, as shown at 23 in Fig. 3, the individual coils being shunted by resistance, as before.

With this change in the reactors, their action toward the fundamental currents and upper harmonics, other than the 6th, 12th, etc., is the same as with the system of Fig. 1. The 6th, 12th, etc. harmonics form three single-phase systems in phase with each other and are not stopped by the impedance device 23 since the algebraic sum of their magnetomotive forces in any complete magnetic circuit in the iron is, at all times, equal to zero. These latter harmonics must, therefore, be offered a path of impedance equivalent to that of the load circuit, such as the resistor 26, a condenser 25 being placed in series therewith to prevent the flow of load current therethrough. A reactor device 24 is placed directly in the load circuit to force these harmonics through the resistor 26 without offering appreciable impedance to the unidirectional load currents.

While I have described my invention in combination with a three-phase system, it is not so limited but is equally applicable to polyphase systems of any phase number, the essential condition being that the resultant resistance of the resistors placed in circuit with the various harmonic currents shall be equivalent to the impedance of the load circuit. Thus, in an $n$-phase system, each resistor 20, 21, 22, etc., should have substantially $n$ times the resistance of the load circuit.

While I have shown my invention in its preferred form, it will be obvious to those skilled in the art that it is not so limited but is susceptible of various minor changes and modifications without departing from the spirit thereof and I desire, therefore, that only such limitations shall be placed thereupon as are imposed by the prior art or are specifically set forth in the appended claims.

I claim as my invention:

1. In a rectifying system, the combination with a source of polyphase electromotive forces, of means for completely rectifying each of said electromotive forces, whereby a plurality of unidirectional current impulses of mutually displaced phase relation are produced, means connecting corresponding poles of said rectifying devices to one neutral point, similar means connecting the remaining poles of said rectifying devices to an additional neutral point, an inductive reactor inserted in each lead between one of said neutral points and one of said rectifying devices of sufficient magnitude to substantially suppress the flow of upper even harmonics, a substantially non-inductive resistance shunting each of said reactors, a load circuit connected between said neutral points, and a condensive reactor connected across said load circuit.

2. In a polyphase rectifying system, the combination with means providing $n$ equally displaced alternating electromotive forces, of means for completely rectifying each of said electromotive forces, whereby $n$ sets of unidirectional current impulses are provided, said sets being equally displaced in phase relationship, connections from corresponding poles of said rectifying device to one neutral point, similar connections from the remaining poles of said rectifying devices to an additional neutral point, a load circuit connected between said neutral points, an inductive reactor inserted in each connection between one of said neutral points and said rectifiers of sufficient magnitude to substantially suppress the flow of upper even harmonics therethrough, a resistor in shunt relation to each of said reactors and of substantially $n$ times the equivalent resistance of said load circuit, and a condenser connected in shunt relation to said load circuit of such capacity as to substantially divert even harmonics which are even multiples of the phase number of the supply circuit from flow in said load circuit.

3. The combination with a source of alternating currents, of means for rectifying said currents, a load circuit, connections for supplying the fundamental component of the rectified impulses to said load circuit, resistance means having a value equivalent to the resistance of the load circuit, and connections for selectively supplying the alternating-current components of the rectified impulses to said resistance means.

4. In a mechanical rectifying system, the combination with means for producing a series of rectified impulses, of means for supplying current paths of substantially equivalent resistance to all components of said impulses, whereby distortion is prevented and the current and voltage impulses are caused to pass through zero values simultaneously.

5. In a rectifying system, the combination of means for producing a series of impulses which may be resolved into a direct-current component and a series of alternating-current components of different frequencies, a load circuit, means for excluding said alternating current components from said load circuit, and means for providing a path exclusive of said load circuit for permitting the flow of said alternating current components, said path having an effective resistance of such value that the several alternating-current components encounter the same voltage drop per ampere of current in said path that they would encounter if they were permitted to pass through said load circuit.

6. The combination with a source of alternating currents, of means for rectifying said currents, a load circuit, an inductive reactor in series with said load circuit, a capacitive reactor in shunt with said load circuit, and a resistor in shunt with said inductive reactor.

7. In a rectifying system, the combination with a source of alternating currents, of means for producing therefrom a series of rectified impulses which may be resolved into a direct-current component and a series of alternating-current components of different frequencies, a load circuit, an inductive reactor in series with said load circuit, a capacitive reactor in shunt with said load circuit for by-passing said alternating current components and a resistor in shunt with said inductive reactor, said resistance being of such value that the several alternating-current components encounter the same voltage drop that they would encounter if they were permitted to pass through said load circuit.

8. The combination with a source of alternating currents, of means for rectifying said currents, a load circuit, an inductive reactor in series with said load circuit, and a shunt circuit containing a capacitive reactor and a resistor in series.

9. In a rectifying system, the combination with a source of alternating currents, of means for producing therefrom a series of rectified impulses which may be resolved into a direct-current component and a series of alternating-current components of different frequencies, a load circuit, an inductive reactor in series with said load circuit, and a shunt circuit containing a capacitive reactor and a resistor in series, said resistance being of such value that the several alternating-current components encounter the same voltage drop that they would encounter if they were permitted to pass through said load circuit.

10. The method of utilizing a rectified, alternating-potential wave which comprises segregating the same into components and loading each of said components with resistor means of equivalent magnitude.

11. The method of utilizing a rectified, alternating-potential wave which comprises segregating the same into a direct current component and harmonic components, applying a load to said direct-current component and loading each of said harmonic components with resistor means of magnitude equivalent to the resistance of the direct-current load.

12. The method of utilizing rectified, polyphase, alternating-potential waves which comprises segregating the rectified potential waves of each phase into a direct current component and harmonic components, loading the direct-current components of all phases with a common load and loading the harmonic components with auxiliary loads of equivalent resistance.

13. The combination with a source of polyphase currents, of means for mechanically rectifying the currents in each phase, a main load supplied by said currents, means for additionally loading said phases whereby current is derived from each phase during substantially the entire duration of each alternation and means for so adjusting the current flow into said main load and said additional loading means as to permit commutation of the currents in each phase at the moment when the voltage in said phase is zero.

14. The combination with a source of polyphase currents, of means for rectifying the currents in each phase, a main load supplied by said currents, means for additionally loading said phases whereby current is derived from each phase during substantially the entire duration of each alternation and means for so adjusting the current flow into said main load and said additional loading means as to permit commutation of the currents in each phase at the moment when the voltage in said phase, and the current through the corresponding rectifier means, is zero.

15. The combination with a source of polyphase currents, of means for mechanically rectifying the same into pulsating currents overlapping each other, a direct-current load circuit supplied with said overlapping currents and means for so adjusting the flow of said overlapping currents as to permit commutation of the currents in each phase at the moment when the voltage in said phase is zero.

16. The combination with a source of polyphase currents, of means for mechanically rectifying the same into pulsating currents overlapping each other, a direct-current load supplied with said overlapping currents and means for so adjusting the flow of said overlapping currents as to permit commutation of the currents in each phase at the moment when the voltage in said phase, and the current through the corresponding rectifier means, is zero.

17. The method of supplying rectified polyphase currents to a common load circuit which comprises so uniformly loading each phase of the rectifier during the entire period of each alternation as to cause the node points of the current and voltage waves to be coincident in each of the respective phases.

In testimony whereof, I have hereunto subscribed my name this 19th day of May, 1919.

JOSEPH SLEPIAN.